United States Patent [19]

Eriksson

[11] Patent Number: 5,236,530
[45] Date of Patent: Aug. 17, 1993

[54] EDGE STRIP CONTROL AND APPARATUS THEREOF

[75] Inventor: Lars Eriksson, Falun, Sweden

[73] Assignee: Asea Brown Boveri AB, Västerås, Sweden

[21] Appl. No.: 875,406

[22] Filed: Apr. 29, 1992

[30] Foreign Application Priority Data

May 14, 1991 [SE] Sweden .............................. 9101449

[51] Int. Cl.⁵ .............................................. B31C 1/00
[52] U.S. Cl. ...................... 156/192; 156/216; 156/467; 156/196; 156/324
[58] Field of Search ............... 156/216, 191, 192, 301, 156/324, 199, 201, 467

[56] References Cited

U.S. PATENT DOCUMENTS

| | | | |
|---|---|---|---|
| 3,548,783 | 12/1970 | Knapp | 226/197 X |
| 4,282,055 | 8/1981 | Bosse | 156/201 X |
| 4,343,422 | 8/1982 | Dabringhaus | 226/197 |
| 4,844,442 | 7/1989 | Gämmerler | 226/197 X |
| 4,898,313 | 2/1990 | Grégoire | 226/197 |

FOREIGN PATENT DOCUMENTS 466742 3/1992 Sweden .

Primary Examiner—David A. Simmons
Assistant Examiner—Charles Rainwater
Attorney, Agent, or Firm—Watson, Cole, Grindle & Watson

[57] ABSTRACT

In a coating machine for coating of strip with a lining which is wider than the strip, a method and a device for filling up the space between the strip and the outer edges of the lining with edge strip, wherein the edge strip is passed inside a bent and folded transport channel, a first bent part of which coincides with the longitudinal direction of the strip.

2 Claims, 2 Drawing Sheets

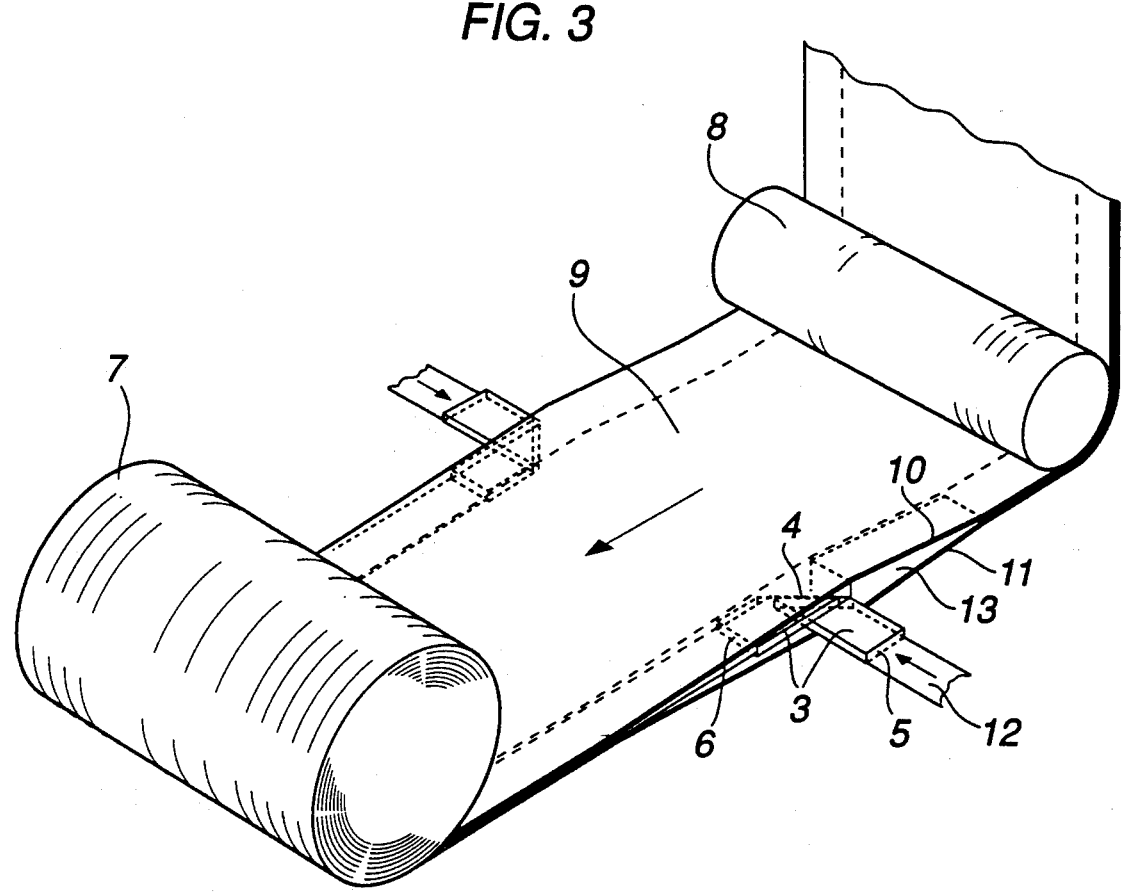

EDGE STRIP CONTROL AND APPARATUS THEREOF

BACKGROUND OF THE INVENTION

1. Field of the Invention

In certain applications where strip material is included it be required that the strip material is provided with a lining on one or on both sides which is normally thin in relation to the thickness of the strip material. The application of these linings often takes place in special coating machines, the configuration of which is determined by what kind of strip is to be coated and by the consistence and shape of the strip. The present invention comprises a method and a device for coating of strip where the coating machine comprises, inter alia, a strip wind-off reel for the non-coated strip, and a wind-up reel for the coated strip as well as a number of intermediate rolls.

2. The Prior Art

The manufacture of strip is performed in special strip rolling mills, foil mills, paper and cardboard manufacturing machines, etc., which are designed based on the material properties of the strip, the width, the thickness, the winding speed, etc. Characteristic of most of the strip-manufacturing tools and machines is, however, that the finished strip is led to a wind-up reel where the strip is wound up into a coil.

The linings with which strip in certain applications, or for various reasons, has to be provided may have different insulating, sealing or protective functions. During cold rolling of strip, for example, a thin layer of paper is placed on one side of the strip before the winding up starts in order to protect the strip against scratches or other damage. Within the packing industry it is very common to coat both aluminum foil and thick paper with a plastic lining for example for use as packaging for soft drinks, milk, etc. In this connection, linings may either be positioned loosely on the strip or be more or less secured to the strip in question.

There are also applications where it is desirable for the width of the linings to be wider than the strip, that is, the side edges of the linings shall extend outside the edges of the strip. In such applications, it is also common for linings to be applied on both sides of the strip. A method and a device according to the invention may be used in coating machines with linings on either one or or both of the sides of the strip and where the linings are wider than the strip to be coated and where the linings are made from coating strips in the form of coils placed on coating strip wind-off reels between the strip wind-off reel of the coating machine and the wind-up reel.

In connection with the above-mentioned coating, problems of various kinds arise. To explain why the problems arise, a short and schematic description will first be given of a coating method with a coating machine which applies linings on both sides of the strip. In addition to the above-mentioned strip wind-off reel, wind-up reel, intermediate rolls and coating strip wind-off reels, such a coating machine also comprises two deflector rolls.

After the coil with the strip to be coated has been placed on the strip wind-off reel, the strip is passed over the intermediate rolls to the wind-up reel. The coating strips, which arrive from respective wind-off reels placed on respective sides of the strip, are each pressed against a respective side of the strip via the above-mentioned deflector rolls. After the deflector rolls, thus, both linings and strip will be passed over the following rolls. Upon passage over these rolls, depending on the direction of rotation of the rolls, first one of the linings and then the other lining will make contact with the periphery of some roll. Because of the stresses which then arise in the linings, undesired formation of wrinkles may arise in the linings. Swedish patent publication number 466 742 describes one method which, with the aid of a roll filling strip, prevents the occurrence of these wrinkles.

To obtain as homogeneous and compact a coil as possible, it is necessary that the space which is formed outside the strip and between the linings of the finished coil be filled in some way. This is suitably done by the introduction of so-called edge filling strip. This is made of strips of thin paper or similar material which are narrow in relation to the strip. To adapt to the thickness of the strip, it may be necessary for the edge filling strip to consist of strips positioned one above the other. In the same way as the strip and the linings, the strips of paper or similar material are also wound in the form of coils on wind-off reels. However, it has proved relatively difficult to insert the edge strips between the two linings and to cause the edge strips to be positioned such that, during the coating process and in an as-wound coil, they have a plane and straight orientation in relation to both the strip and the outer edges of the linings.

SUMMARY OF THE INVENTION

The present invention comprises a method and a device for controlling the edge strips such that they are accurately positioned. This is done with the aid of a transport channel which is so dimensioned that the edge strip may run freely, but still in a controlled manner, inside the channel, that is, that the inner width of the channel is insignificantly wider than the edge strip and that the height of the channel is insignificantly greater than the thickness of the edge strip. On one of the broad sides of the channel, a piece having the shape of a parallelogram is cut away, where one pair of parallel lines coincides with the longitudinal direction of the channel and the other pair of parallel lines has an inclination of 45 degrees relative to the longitudinal direction of the channel. Around a conceived line parallel to and located halfway between these 45-degree lines, the channel is bent such that the parts of the channel extending from the bend are folded and make an angle of 90 degrees relative to each other. The bending is suitably done in such a way that the 45-degree transition has a shape which corresponds to half a circular-cylindrical surface. Because of the folding, the folded parts of the channel will be positioned in planes which differ somewhat from each other owing to the radius of the bending.

Because the linings generally are relatively elastic, a wedge-shaped tool may be inserted between the outer edges of the linings, forcing the linings apart. This tool is placed between the last roll of the coating machine and the wind-up reel and as close to the wind-up reel as possible. The bent channel is then inserted into the gap which is thereby formed such that one channel end becomes parallel to the longitudinal direction of the linings. Now, as mentioned above, the width of the edge strip and hence also the width of the channel are dimensioned such that, if the outer edge of the channel is parallel to and substantially coincides with the outer edges of the linings, the space into the strip will be filled. The other end of the channel will now point at an angle of 90 degrees straight out from the linings.

By inserting the edge strip into the channel end which extends straight out from the linings, tilting the edge strip around the circular-cylindrical surface and then passing the edge strip into that part of the channel which runs parallel to the outer edges of the linings while at the same time ensuring that this channel end terminates just before the strip, the linings and the edge strip reach the wound-up coil, the edge strip will remain fixed in the correct position in the finished coil.

BRIEF DESCRIPTION OF THE DRAWINGS

FIG. 3 shows the end part of a coating machine with a partially wound-up coil and also shows how the bent and folded transport channel conducts edge strip in between two linings.

DESCRIPTION OF THE PREFERRED EMBODIMENTS

Figure 1:
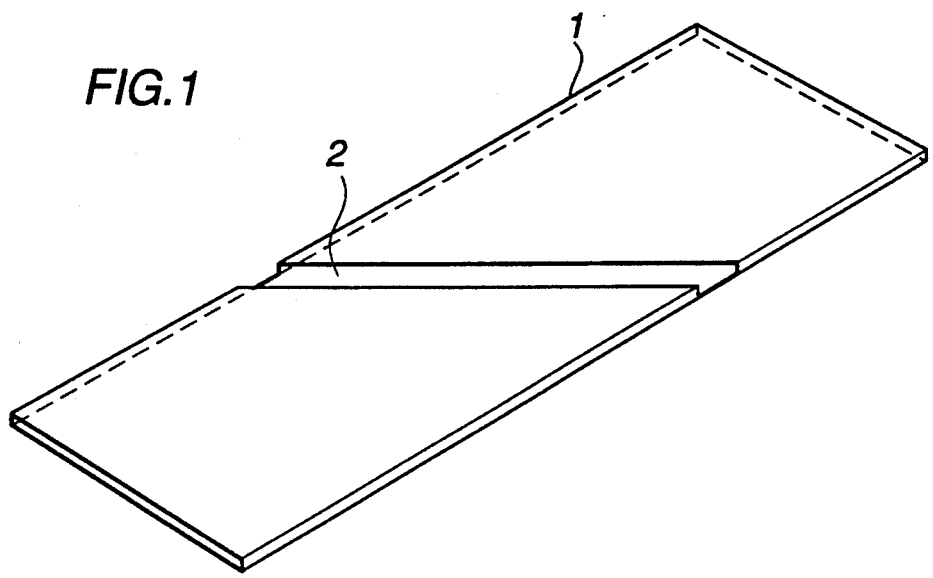
FIG. 1 shows an unbent transport channel, prepared for bending and folding.

FIG. 1 shows an unbent transport channel 1. The channel has been prepared for bending by cutting away a parallelogram-shaped piece 2 in the centre of the channel and on one of its broad sides, one pair of parallel lines coinciding with the longitudinal direction of the channel and the other pair of parallel lines having an inclination of 45 degrees relative to the longitudinal direction of the channel.

Figure 2:
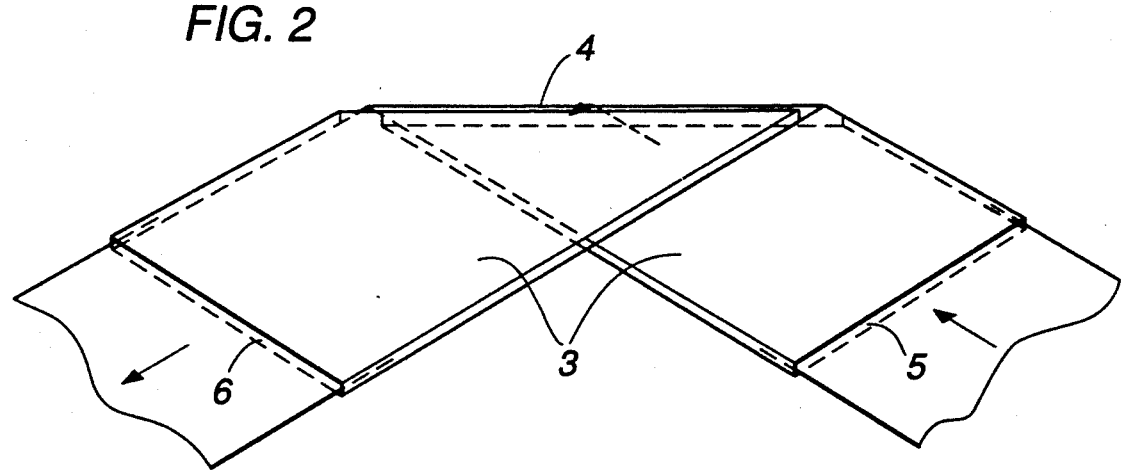
FIG. 2 shows a bent and folded transport channel.

FIG. 2 shows the appearance of the transport channel 3 after bending and folding. The semicircular-cylindrical surface, rotated through 45 degrees, formed during bending and folding is shown at 4. The two channel parts on each side of the bend and the fold now form an angle of 90 degrees in relation to each other. The edge strip is intended to be inserted into a first orifice 5. When the edge strip arrives at the open part which is bent through 45 degrees, the edge strip is turned around this part and inserted into the channel part which is rotated through 90 degrees and then emerges at the other orifice 6 of the channel.

FIG. 3 shows the end part of a coating machine, a partially wound-up coil being shown at 7. The last roll of the coating machine is shown at 8 in the figure. Between the coil and the roll, 9 shows the strip to be coated and 10 and 1 indicate the two linings. As mentioned above, the edge strip 12 is passed into the transport channel at its first orifice 5, is turned around the part which is bent through 45 degrees and is then passed in parallel with the outer edge of the linings via the second orifice 6 to the adjacently positioned wound-up coil.

To be able to insert the transport channel with the edge strip between the outer edges of the two linings, these have to be moved apart at the edges. Since, as mentioned above, the linings are relatively resilient, the necessary opening between the linings for the transport channel may be provided by the insertion of a wedge-shaped tool 13 between the linings.

In the embodiment described above, the transport channel has been bent and folded such that the two halves form an angle of 90 degrees with each other. Within the scope of the invention, of course, the angle between the two halves may assume any value for the best possible adaptation to the coating machine in other respect. However, the minimum and maximum bending angles will in such case be determined by the available distance between the coil and the last roll. In the same way, the scope of the invention allows for the transport channel to be bent and folded several times if this is considered suitable, and possibly allows for the use of several channels bent and folded once.

I claim:

1. A method in a coating machine for coating a strip with lining which is wider than the strip, wherein an edge strip is placed between two linings and adjacent the coated strip for the purpose of filling up the space between the two linings in order thus to achieve an evenly wound coil and wherein the placing of the edge strip is achieved by passing the edge strip inside a bent and folded transport channel, a first bent part of which is placed such that a longitudinal direction thereof coincides with a longitudinal direction of the strip and the lining, the transport channel being placed in a lateral direction such that an edge facing an edge of the lining coincides with the edge of the lining, a second bent part of the transport channel being directed outwards from the edge of the lining.

2. A device for use in a coating machine for coating of strip with lining which is wider than the strip, the device functioning to place an edge strip between two linings and adjacent a coated strip for the purpose of filling up a space between the two linings in order thus to achieve an evenly would coil, the device comprising means forming a transport channel inside of which the edge strip is passed, the transport channel being bent and-folded so as to from an angle between the edge strip passed into the transport channel, the transport channel being arranged such that a first bent part thereof coincides with a longitudinal direction of the strip and the linings, in a lateral direction the transport channel being arranged such that an edge facing an edge of the lining coincides with the edge of the lining.

* * * * *